United States Patent
Sasaki

(10) Patent No.: US 7,334,256 B2
(45) Date of Patent: Feb. 19, 2008

(54) SECURITY DEVICE, KEY DEVICE, AND PROGRAM PROTECTION SYSTEM AND METHOD

(75) Inventor: Norio Sasaki, Tokyo (JP)

(73) Assignee: Namco Limited (JP)

( * ) Notice: Subject to any disclaimer, the term of this patent is extended or adjusted under 35 U.S.C. 154(b) by 665 days.

(21) Appl. No.: 10/839,438

(22) Filed: May 5, 2004

(65) Prior Publication Data

US 2004/0268134 A1 Dec. 30, 2004

Related U.S. Application Data

(63) Continuation of application No. 09/485,160, filed as application No. PCT/JP99/02980 on Jun. 3, 1999, now abandoned.

(30) Foreign Application Priority Data

Jun. 4, 1998 (JP) ................................. 10-156120

(51) Int. Cl.
*G06F 13/00* (2006.01)

(52) U.S. Cl. .......................................................... 726/2

(58) Field of Classification Search ...................... 726/2
See application file for complete search history.

(56) References Cited

U.S. PATENT DOCUMENTS 5,550,999 A * 8/1996 Nagano et al. ............. 711/115

* cited by examiner

*Primary Examiner*—Gilberto Barron
*Assistant Examiner*—Devin Almeida
(74) *Attorney, Agent, or Firm*—Fitch, Even, Tabin & Flannery

(57) ABSTRACT

A security device, a key device and a program protection system and method capable of coping with copy protection evading software or the modification of a board. A comparison is made between a security code unique to a game program which is obtained from a prestored key code and a security code obtained by generating a random number by using a game program stored in a storage device as an initial value. When they disagree, the operation of the function module is stopped. The copy protection is executed by hardware. By integrally forming the hardware and the function module, it is possible to cope with copy protection evading software or the modification of a board.

8 Claims, 4 Drawing Sheets

SECURITY DEVICE, KEY DEVICE, AND PROGRAM PROTECTION SYSTEM AND METHOD

This is a continuation of prior application Ser. No. 09/485,160, filed Feb. 21, 2002 now abandoned; which is a §371 of PCT/JP99/02980 filed Jun. 3, 1999, which claims priority of Japanese Patent No. 10-156120, filed Jun. 4, 1998, which is hereby incorporated herein by reference in its entirety.

FIELD OF THE INVENTION

The present invention relates to a security device, a key device, a program protection system and method.

DESCRIPTION OF THE PRIOR ART

A conventional practice to protect a program such as a game program stored in a storage device such as ROM against being illicitly copied involves preparing an IC with a unique key for each program, comparing by software a password obtained from the ROM and a key obtained from the IC, and determining the illicit copying when the comparison between the keys detects any disagreement.

FIG. 1 is a block diagram showing an overview of a conventional copy prevention or program protection method.

In FIG. 1, a storage device 130 is a device storing a program (for example, ROM), and a key IC 140 is an IC storing a key unique to the storage device 130. The storage device 130 and the key IC 140 are mounted on the same board 160, for example a game board 160, and removably connected to a bus 150. A data processor 100 is a processor such as CPU, and a storage device 110 is one such as RAM onto which program protection software is loaded from other storage devices such as ROMs (not shown). A function module 120 is a module containing a variety of functions, such as video signal processing, that are invoked as the program stored in the storage device 130 (such as ROM) is executed. The data processor 100, storage device 110 and function module 120 are connected to the bus 150.

The data processor 100 executes the copy protection software loaded in the storage device 110 to perform a predetermined calculation on the content of the storage device 130 and thereby generate a password unique to the content of the storage device 130. The data processor 100 then compares the password with the key contained in the key IC 140 and, when they disagree, decides that the storage device 130 was illicitly copied, instructing the function module 120 to stop operation.

The copy protection method described above can deal with fraudulent products that use an old game board 160 with a storage device 130 containing a new game program B mounted in the place of a storage device 130 containing an old game program A.

With the above conventional method, however, because the data processor 100 performs copy protection by using software, it is highly likely that software to evade copy protection may be manufactured. Further, even when the storage device 130 is found to be a fraudulent product, a high possibility remains that the function module 120 may be able to continue operation by modifying the entire board including the game board 160. The above conventional method cannot cope with either of these cases.

SUMMARY OF THE INVENTION

It is therefore an object of the present invention to solve the above-described problems and to provide a security device, a key device and a program protection system and method in which hardware and a function module are formed integrally to cope with copy protection evasion software and with an attempt to modify the board.

According to the invention a program protection system comprises a storage device storing a program; a key device for generating a predetermined random number as a first security code by using a first key code stored beforehand as an initial value; a security device for inputting the program stored in the storage device, generating a predetermined random number as a second security code by using a second key code calculated from the program as an initial value, inputting the first security code from the key device, comparing the first security code and the second security code and, when they do not agree, generating an error signal; and a function module formed integral with the security device and controlled in its operation by the error signal generated by the security device.

According to the invention, the security device may comprise a second key code calculation means for calculating the second key code by performing a predetermined calculation on the program taken in from the storage device; a second key code storage means for storing the second key code calculated by the second key code calculation means; a second security code generation means for inputting the second key code from the second key code storage means and generating a predetermined random number as the second security code by using the second key code as an initial value; a transfer request signal generation means for generating a signal requesting the key device to transfer the first security code; a security device side transmission means for transmitting the signal generated by the transfer request signal generation means; a security device side reception means for receiving the first security code transferred from the key device; a delay means for delaying the second security code generation means in inputting the second key code from the second key code calculation means until the security device side reception means receives the first security code from the key device; a comparison means for comparing the first security code received by the security device side reception means and the second security code generated by the second security code generation means to determine whether they agree; and an error signal generation means for, when the comparison means determines that the first and second security codes disagree, generating an error signal a predetermined time later which notifies the function module of the security code disagreement. Further, the key device may comprise: a key device side reception means for receiving the signal transmitted from the security device side transmission means; a detection means for detecting that the received signal is a transfer request signal; a first key code storage means for storing the first key code beforehand; a first security code generation means for inputting the first key code from the first key code storage means and generating a predetermined random number as the first security code by using the first key code as an initial value; and a key device side transmission means for transmitting the generated first security code to the security device.

According to the invention, the security device side transmission means may have an encryption means for encrypting the signal to be transferred to the key device, and the key device side reception means may have a decryption means for decrypting the signal encrypted by the encryption means.

According to the invention, the key device side transmission means may have a second security code encryption means for encrypting the second security code to be transferred to the security device, and the security device side reception means may have a second security code decryption means for decrypting the second security code encrypted by the second security code encryption means.

According to the invention, the function module may be a video processing module for processing a video signal generated as a result of execution of a program.

A security device according to the invention, which performs a security check by comparing a first security code taken in and a second security code obtained by generating a predetermined random number by using as an initial value a key code calculated by a program taken in, may comprise: a key code calculation means for calculating a key code by performing a predetermined calculation on the input program; a key code storage means for storing the key code calculated by the key code calculation means; a second security code generation means for inputting the key code from the key code storage means and generating a predetermined random number as the second security code by using the key code as an initial value; a transfer request signal generation means for generating a signal requesting the transfer of the first security code; a transmission means for transmitting the signal generated by the transfer request signal generation means; a reception means for receiving the first security code; a delay means for delaying the second security code generation means in inputting the key code from the key code calculation means until the reception means receives the first security code; a comparison means for comparing the first security code received by the reception means and the second security code generated by the second security code generation means to determine whether they agree; and an error signal generation means for, when the comparison means determines that the first and second security codes disagree, generating an error signal a predetermined time later.

According to the invention, the transmission means may have an encryption means for encrypting the transfer request signal, and the reception means may have a decryption means for decrypting the encrypted first security code.

A key device according to the invention, which, in response to a received transfer request signal, transfers a security code obtained by generating a random number by using a key code stored beforehand as an initial value, may comprise a reception means for receiving a signal; a detection means for detecting that the received signal is the transfer request signal; a key code storage means for storing the key code beforehand; a security code generation means for inputting the key code from the key code storage means and generating a predetermined random number as the security code by using the key code as an initial value; and a transmission means for transmitting the generated security code.

According to the invention, the reception means has a decryption means for decrypting the received encrypted signal and the transmission means has a security code encryption means for encrypting the security code to be transferred.

The invention may comprise a first security code generation step of generating a predetermined random number as a first security code by using a first key code stored beforehand as an initial code; a second security code generation step of inputting a program stored in a storage device and generating a predetermined random number as a second security code by using a second key code calculated by the program as an initial value; an error signal generation step of comparing the first security code and the second security code and, when they disagree, generating an error signal; and a control step of controlling the operation of a function module according to the generated error signal, the function module being adapted to execute the program.

According to the invention, the second security code generation step may comprise a second key code calculation step of calculating the second key code by performing a predetermined calculation on the input program; a second key code storage step of storing the second key code calculated by the second key code calculation step; a second security code generation step of generating a predetermined random number as the second security code by using the second key code as an initial value; a transfer request signal generation step of generating a signal requesting the transfer of the first security code; a transfer request signal transmission step of transmitting the transfer request signal; a delay step of delaying the input of the second key code until the first security code is received; a first security code reception step of receiving the first security code; a comparison step for comparing the first security code and the second security code to determine whether they agree; and an error signal generation step of, when the comparison step determines that the first and second security codes disagree, generating the error signal a predetermined time later which notifies the function module of the security code disagreement. Further, the first security code generation step may comprise a reception step of receiving a transmitted signal; a detection step of detecting that the received signal is the transfer request signal; a first key code storage step of storing the first key code beforehand; a first security code generation step of generating a predetermined random number as the first security code by using the first key code as an initial value; and a first security code transmission step of transmitting the generated first security code to the security device.

According to the invention, a program protection system may comprise a storage device storing data; a key device for generating a predetermined random number as a first security code by using a first key code stored beforehand as an initial value; a security device for inputting the data stored in the storage device, generating a predetermined random number as a second security code by using a second key code calculated from the data as an initial value, inputting the first security code from the key device, comparing the first security code and the second security code and, when they do not agree, generating an error signal; and a function module formed integral with the security device and controlled in its operation by the error signal generated by the security device.

DETAILED DESCRIPTION OF THE PREFERRED EMBODIMENTS

One embodiment of the present invention will be described in detail by referring to the accompanying drawings.

Figure 1:
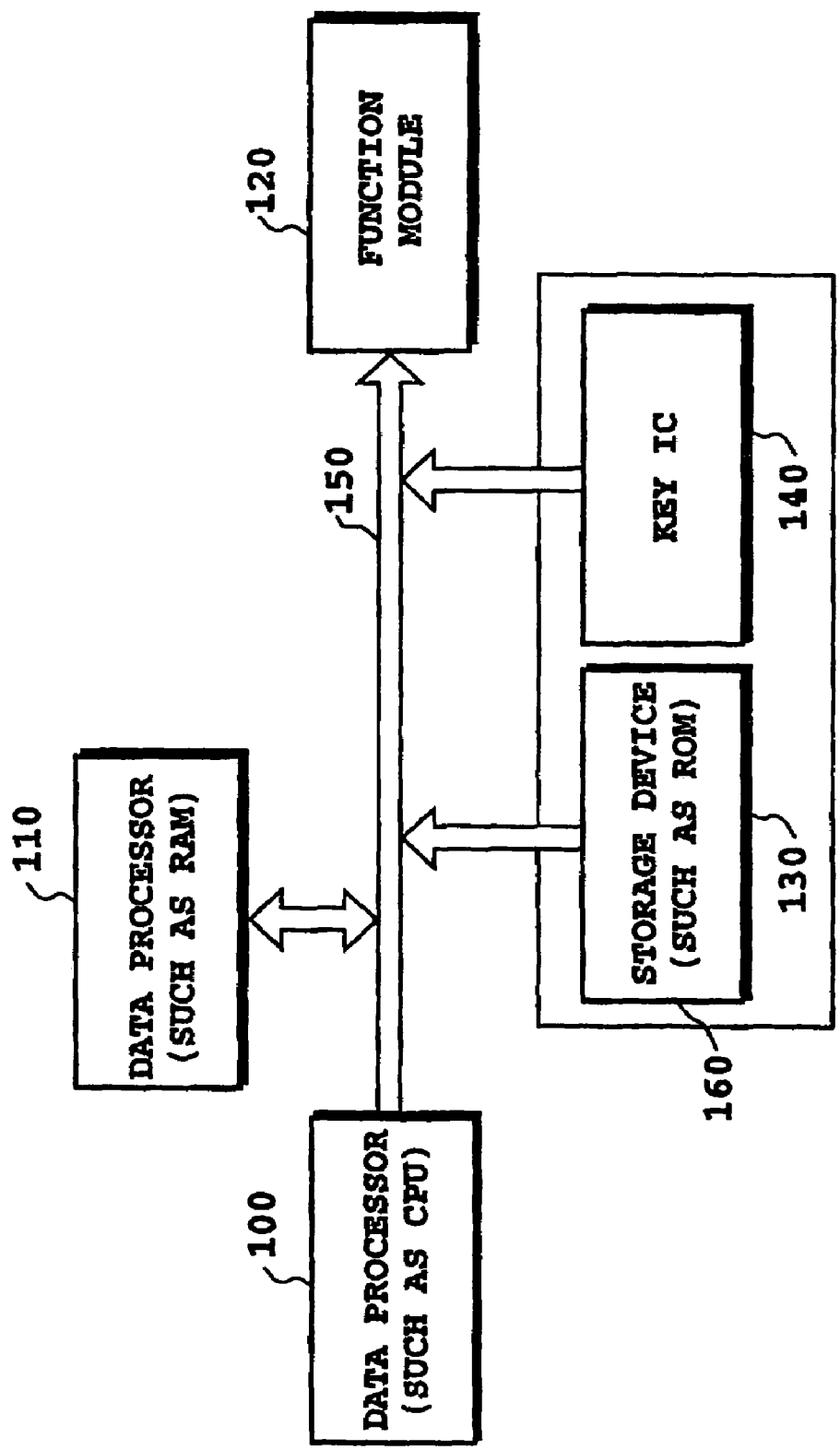
FIG. 1 is a block diagram showing the outline of a conventional copy prevention or program protection method.
Figure 2:
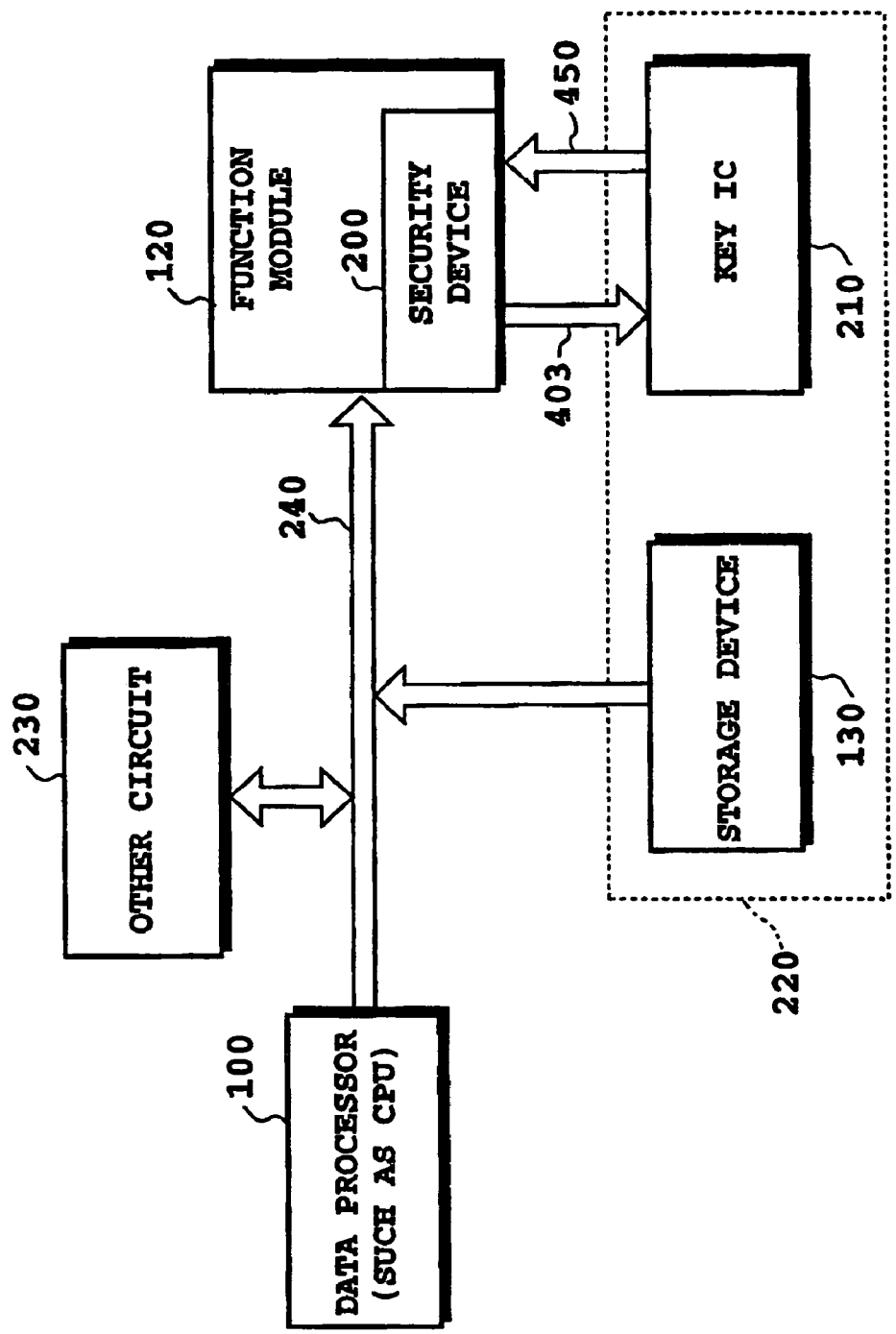
FIG. 2 is a block diagram showing the outline of a program protection method of the present invention.

FIG. 2 is a block diagram showing the outline of the program protection method according to this invention. In FIG. 2, components with the same reference numerals as those shown in FIG. 1 have identical functions and therefore their explanations are omitted.

In FIG. 2, a security device 200 is a device for performing a security check (program protection) by hardware and is formed integral with the function module 120. It may for example be constructed of a custom IC. The key IC 210 has a similar function to that of the key IC 140 of FIG. 1 but, unlike the key IC 140, is connected to the security device 200, rather than being directly connected to the bus 150. Other circuit 230 includes the storage device 110 of FIG. 1 and is connected to the bus 240.

The data processor 100 cannot directly access the key IC 210 through the bus 240 but only the security device 200 is allowed a direct access to the key IC 210. Thus, making modified software for evading the copy protection becomes very difficult. The key IC 210 should preferably be constructed of CPLD (Complex Programmable Logic Device) to eliminate the possibility of its content being analyzed by physical manipulation. Because the function module 120 and the security device 200 are integrally formed and sealed in a single package, the program protection system of this invention cannot be nullified through the modification of the board.

Figure 3:
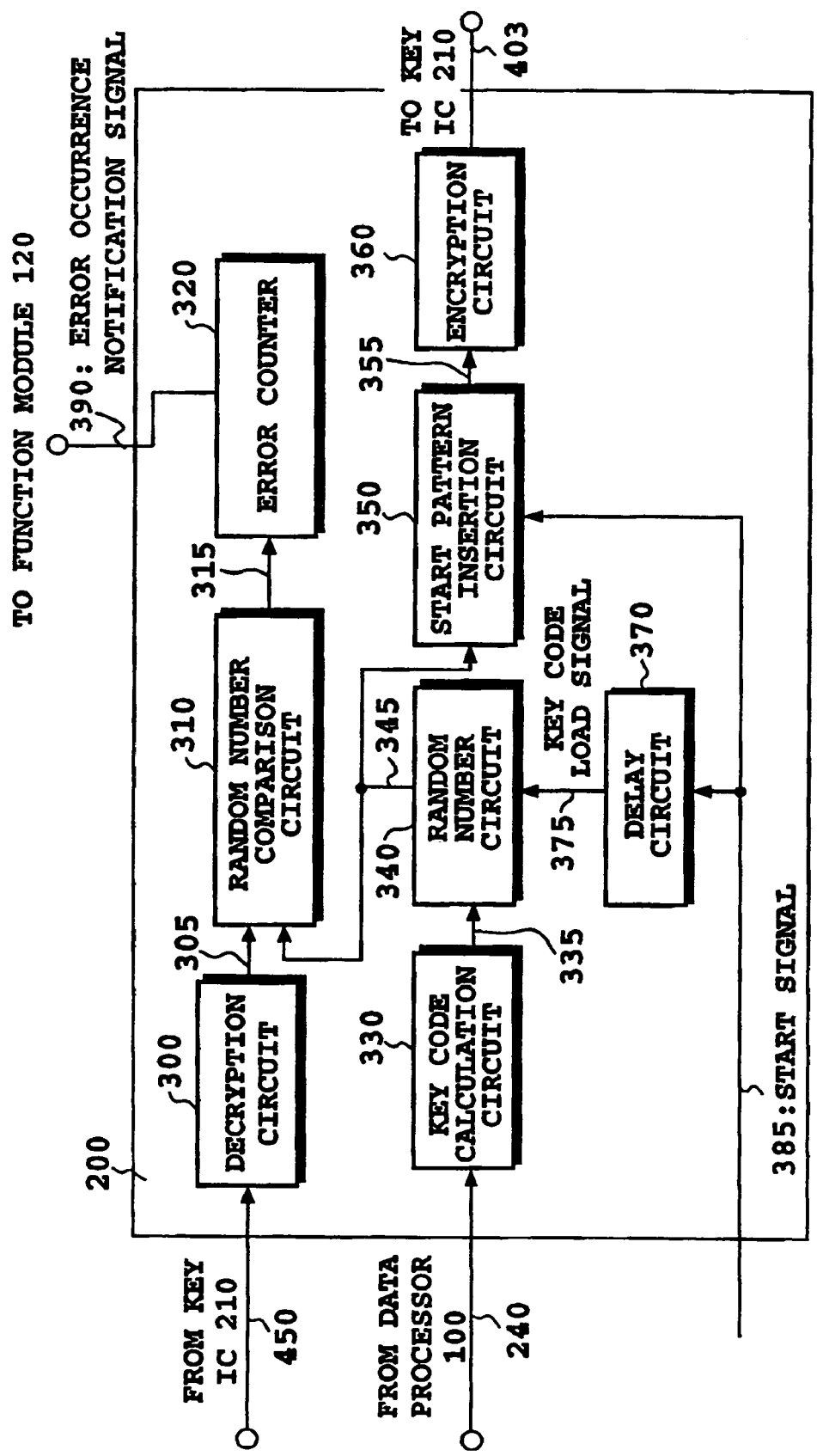
FIG. 3 is a block diagram showing the function of a security device of the invention.

FIG. 3 shows the function of the security device 200 in a block diagram.

In FIG. 3, a bus 240 is connected to the data processor 100 and also to the storage device 130 as already shown in FIG. 2. Through this bus 240 a game program for example is fed from the storage device 130 into a key code calculation circuit 330. Based on the received program, the key code calculation circuit 330 calculates a key code to be used by a random number circuit 340 as an initial value when generating a random number, and saves it in its internal storage (not shown). The method of calculating the key code uses all or part of the game program stored in the storage device 130. This method, for example, involves dividing the game program into 32-bit sections, taking the first 32-bit section as x1, and applying an arbitrary function f to the x1 to obtain f(x1). The next 32-bit section is taken as x2 and similar processing is performed to obtain f(x2+f(x1)). This process is repeated for all or part of the game program to produce a key code. The random number circuit 340 takes in the key code through a line 335, uses the key code as an initial value in generating a random number, and uses the random number as a security code. A known method for generating a random number may be used. A start pattern insertion circuit 350 is a circuit to generate a pattern used to request the key IC 210 to transfer its security code from the key IC 210. Normally this pattern is not generated and the signal on the line 345 is output as is onto the line 355. That is, the start pattern insertion circuit 350 can be arranged as a shift register. When a start pattern is inserted by the start pattern insertion circuit 350, the start pattern is output on the line 355 for transfer to the key IC 210. In this way the request for security code transfer can be presented to the key IC 210. The start pattern may be an arbitrary 5-bit pattern, for example. In that case the start pattern insertion circuit 350 can be arranged as a 5-bit shift register. The start pattern, although it can be transferred directly to the key IC 210, may be encrypted by an encryption circuit 360 before being transferred to the key IC 210 through the line 403, as shown in FIG. 3. Among the possible encryption methods are a method of inserting a dummy bit into a signal, a method of shuffling the signal, and other known methods. The insertion of the start pattern is specified by a start signal 385. The start signal 385, which is supplied to the start pattern insertion circuit 350, can use any signal that is generated at predetermined intervals. It may be a video synchronization signal used by a video processing module (not shown) in the function module 120. Or it may be a seek signal used in the hard disk (not shown).

A security code contained in the key IC 210 is sent to the security device 200 through the line 450. The security code from the key IC 210, if it has been encrypted by the key IC 210, is decrypted by a decryption circuit 300. When it is not encrypted by the key IC 210, the decryption circuit 300 may not be used. Until the key IC 210 sends the security code, the random number circuit 340 does not take in the key code from the storage in the key code calculation circuit 330. For this reason, the start signal 385 is also supplied to a delay circuit 370 which sends a key code load signal 375 with a predetermined time delay to the random number circuit 340. With the key code load signal 375 received, the random number circuit 340 retrieves the key code from the storage (not shown) in the key code calculation circuit 330 to generate a random number and outputs this random number as a security code on the line 345.

A random number comparison circuit 310 takes in a security code on the line 305 from the key IC 210 and a security code on the line 345 from the random number circuit 340 and then compares them. The random number comparison circuit 310 produces 1 when they agree and 0 when they disagree, and sends its output through the line 315 to an error counter 320. When it has counted a predetermined number of errors, the error counter 320 sends an error occurrence notification signal 390 to the function module 120. While the start signal 385 is kept waiting by the delay circuit 370, no security code appears on the line 345 or the line 305, with the result that the random number comparison circuit 310 decides that the security codes do not agree and continues to output 0 on the line 315. By counting a predetermined number of 0s, this output can be ignored. Further, counting a predetermining number of errors can gain time for the data processor 100 to write data into the key code calculation circuit 330.

Figure 4:
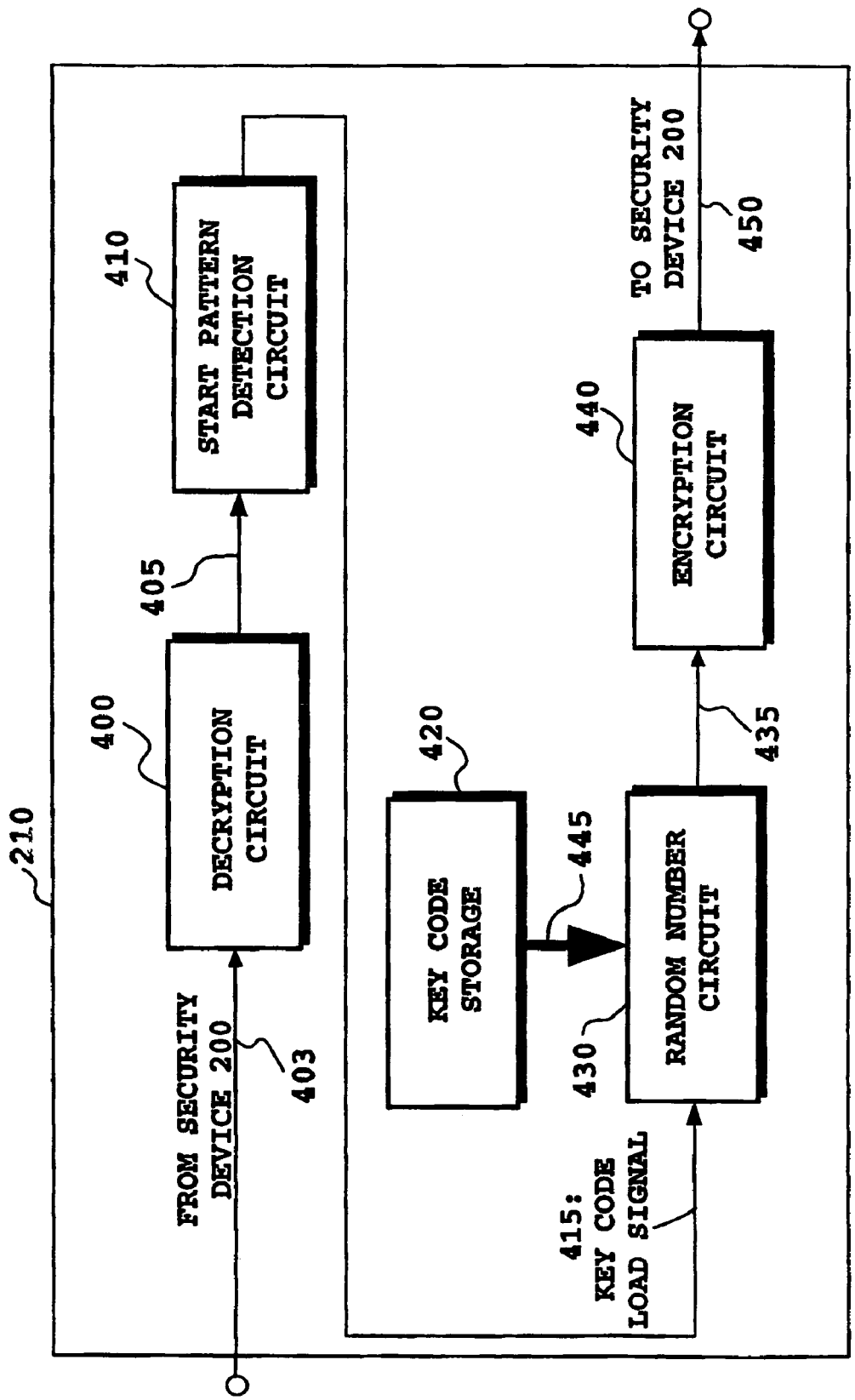
FIG. 4 is a block diagram showing a key IC of the invention.

FIG. 4 shows a block diagram of the key IC 210.

In FIG. 4, the signal on the line 403 from the security device 200 is entered into a decryption circuit 400. When the signal is not encrypted by the encryption circuit 360, the signal on the line 403 is transferred as is onto the line 405. A start pattern detection circuit 410 detects the start pattern inserted by the start pattern insertion circuit 350. When it detects the start pattern, the start pattern detection circuit 410 outputs a key code load signal 415 to a random number circuit 430. Upon receiving the key code load signal 415, the random number circuit 430 retrieves a key code from a key code storage 420 in which the key code is stored beforehand, and uses this key code as an initial value in generating a random number, which is used as a security code. The security code obtained from the key code stored beforehand in the key code storage 420 is a unique security code assigned to the game program in the storage device 130. The security code thus obtained is fed through the line 435 to an encryption circuit 440. When encryption is not used, the signal on the line 435 is output as is on the line 450 to the security device 200. The encryption method may be one that inserts a dummy bit into the signal, one that shuffles the signal, or other known methods.

As described above, the unique security code for the game program in the storage device 130 is obtained from the key IC 210. Because the key IC 210 is constructed of CPLD, it is very unlikely that the unique security code may be stolen through internal analysis using physical tampering. When the storage device 130 is replaced with a storage device containing a different game program or with an illicitly modified product, the security code obtained from the replaced storage device and the security code obtained from the key IC 210 are not equal. As a result, the security device 200 outputs an error occurrence notification signal 390 to the function module 120, thereby stopping the operation of the function module 120. For example, it is possible to stop the operation of the video signal processing module (not shown) in the function module 120, display an error indication on the screen, and stop the game.

The encryption executed by the encryption circuit 360 in the security device 200 and the encryption executed by the encryption circuit 440 in the key IC 210 may or may not be the same.

Further, the cryptographic processing executed by the encryption circuit 360 and the encryption circuit 440 is not limited to the one described above and may use a variety of known cryptographic methods. For example, instead of a value given by the random number circuit, a value obtained by counting the data capacity of a program may be used for generating a security code. Data to be protected against illicit copying is not limited to programs but can include figures, pictures and various other kinds of data.

As described above, by executing the copy protection by hardware and integrally forming the hardware and the function module, this invention can provide a security device, a key device, and a program protection system and method that can cope with copy protection evading software or with modification of a board.

What is claimed is:

1. A program protection system comprising:
a storage device storing a program;
a key device for generating a predetermined number as a first security code by using a first key code stored beforehand as an initial value;
a security device for inputting the program stored in the storage device, generating a predetermined number as a second security code by using a second key code calculated from the program as an initial value, inputting the first security code from the key device, comparing the first security code and the second security code and, when they do not agree, generating an error signal; and
a function module controlled in its operation by the error signal generated by the security device;
wherein the security device is formed integral with the function module, and wherein the security device comprises:
a second key code calculation means for calculating the second key code by performing a predetermined calculation on the program taken in from the storage device;
a second key code storage means for storing the second key code calculated by the second key code calculation means;
a second security code generation means for inputting the second key code from the second key code storage means and generating a predetermined number as the second security code by using the second key code as an initial value;
a transfer request signal generation means for generating a signal requesting the key device to transfer the first security code;
a security device side transmission means for transmitting the signal generated by the transfer request signal generation means;
a security device side reception means for receiving the first security code transferred from the key device;
a delay means for delaying the second security code generation means in inputting the second key code from the second key code calculation means until the security device side reception means receives the first security code from the key device;
a comparison means for comparing the first security code received by the security device side reception means and the second security code generated by the second security code generation means to determine whether they agree; and
an error signal generation means for, when the comparison means determines that the first and second security codes disagree, generating an error signal a predetermined time later which notifies the function module of the security code disagreement;
wherein the key device comprises:
a key device side reception means for receiving the signal transmitted from the security device side transmission means;
a detection means for detecting that the received signal is a transfer request signal;
a first key code storage means for storing the first key code beforehand;
a first security code generation means for inputting the first key code from the first key code storage means and generating a predetermined number as the first security code by using the first key code as an initial value; and
a key device side transmission means for transmitting the generated first security code to the security device.

2. A program protection system according to claim 1, wherein the security device side transmission means has an encryption means for encrypting the signal to be transferred to the key device, and
the key device side reception means has a decryption means for decrypting the signal encrypted by the encryption means.

3. A program protection system according to claim 1, wherein
the key device side transmission means has a second security code encryption means for encrypting the second security code to be transferred to the security device, and
the security device side reception means has a second security code decryption means for decrypting the second security code encrypted by the second security code encryption means.

4. A program protection system according to claim 1, wherein the function module is a video processing module for processing a video signal generated as a result of execution of a program.

5. A security device for performing a security check by comparing a first security code taken in and a second security code obtained by generating a predetermined number by using as an initial value a key code calculated by a program taken in, the security device comprising:

a key code calculation means for calculating a key code by performing a predetermined calculation on the input program;

a key code storage means for storing the key code calculated by the key code calculation means;

a second security code generation means for inputting the key code from the key code storage means and generating a predetermined number as the second security code by using the key code as an initial value;

a transfer request signal generation means for generating a signal requesting the transfer of the first security code;

a transmission means for transmitting the signal generated by the transfer request signal generation means;

a reception means for receiving the first security code;

a delay means for delaying the second security code generation means in inputting the key code from the key code calculation means until the reception means receives the first security code;

a comparison means for comparing the first security code received by the reception means and the second security code generated by the second security code generation means to determine whether they agree; and an error signal generation means for, when the comparison means determines that the first and second security codes disagree, generating an error signal a predetermined time later.

6. A security device according to claim 5, wherein the transmission means has an encryption means for encrypting the transfer request signal, and the reception means has a decryption means for decrypting the encrypted first security code.

7. A key device for, in response to a received transfer request signal, transferring a security code obtained by generating a number by using a key code stored beforehand as an initial value, the key device comprising:

a reception means for receiving a signal;

a detection means for detecting that the received signal is the transfer request signal;

a key code storage means for storing the key code beforehand;

a security code generation means for inputting the key code from the key code storage means and generating a predetermined number as the security code by using the key code as an initial value; and a transmission means for transmitting the generated security code, wherein the reception means has a decryption means for decrypting the received encrypted signal, and the transmission means has a security code encryption means for encrypting the security code to be transferred.

8. A program protection method comprising:

a first security code generation step of generating a predetermined number as a first security code by using a first key code stored beforehand as an initial code;

a second security code generation step of inputting a program stored in a storage device and generating a predetermined number as a second security code by using a second key code calculated by the program as an initial value;

an error signal generation step of comparing the first security code and the second security code and, when they disagree, generating an error signal; and a control step of controlling the operation of a function module according to the generated error signal, the function module being adapted to execute the program;

wherein the first security code generation step comprises:

a reception step of receiving a transmitted signal;

a detection step of detecting that the received signal is the transfer request signal;

a first key code storage step of storing the first key code beforehand;

a generation step of generating a predetermined number as the first security code by using the first key code as an initial value; and a transmission step of transmitting the generated first security code to the security device; and wherein the second security code generation step comprises:

a second key code calculation step of calculating the second key code by performing a predetermined calculation on the input program;

a second key code storage step of storing the second key code calculated by the second key code calculation step;

a generation step of generating a predetermined number as the second security code by using the second key code as an initial value;

a transfer request signal generation step of generating a signal requesting the transfer of the first security code;

a transfer request signal transmission step of transmitting the transfer request signal;

a delay step of delaying the input of the second key code until the first security code is received;

a first security code reception step of receiving the first security code;

a comparison step for comparing the first security code and the second security code to determine whether they agree; and an error signal generation step of, when the comparison step determines that the first and second security codes disagree, generating the error signal a predetermined time later which notifies the function module of the security code disagreement.

* * * * *